United States Patent [19]

Oleff et al.

[11] Patent Number: 4,639,046
[45] Date of Patent: Jan. 27, 1987

[54] INJECTION MOLDED SYNTHETIC WHEEL

[75] Inventors: Werner Oleff, Ruscherstr. 13, D-4972 Löhne 3; Fritz G. Pape, Porta Westfalica, both of Fed. Rep. of Germany

[73] Assignees: Werner Oleff, Löhne; ASV Stübbe GmbH & Co KG, Vlotho, both of Fed. Rep. of Germany; a part interest

[21] Appl. No.: 589,458

[22] Filed: Mar. 14, 1984

[51] Int. Cl.⁴ .............................................. B60B 5/04
[52] U.S. Cl. .................................. 301/63 PW; 301/65
[58] Field of Search ................. 301/63 PW, 64 R, 65; 264/271.1, 273, 275; 29/159 R; 152/386, 379.3

[56] References Cited

U.S. PATENT DOCUMENTS 680,332  8/1901  Kightlinger .......................... 152/386
4,289,186  9/1981  Wilde ................................ 152/379.3

FOREIGN PATENT DOCUMENTS 2302869  1/1985  France .................................. 301/65

OTHER PUBLICATIONS

*Plastics Engineering Handbook*—1976, The Society of the Plastics Industry Inc., fourth edition.

Primary Examiner—David A. Scherbel
Attorney, Agent, or Firm—Becker & Becker, Inc.

[57] ABSTRACT

A wheel of synthetic material for bicycles and the like. The wheel includes a rim, a plurality of spokes, and a hub, and is made in one piece by means of injection molding at the hub. Between each two adjacent spokes, the rim has a wall element which extends in the circumferential direction of the rim, extends from the connection location of each spoke on the rim to the middle of the rim portion between two spokes, and is rheologically designed as a preliminary flow cross-sectional area such that preliminary flows of the synthetic material enter the wall element from both spokes and flow more quickly from the two spoke connection locations to the middle of the rim portion than the two circumferential flows of synthetic material which advance in the remaining rim walls. This prohibits the two circumferential flows in the remaining rim walls from meeting at the middle of the rim portion and forming a cold flow seam which would considerably reduce the strength of the rim at this central rim portion.

1 Claim, 6 Drawing Figures

INJECTION MOLDED SYNTHETIC WHEEL

BACKGROUND OF THE INVENTION

1. Field of the Invention

The present invention relates to a wheel of synthetic material for bicycles or the like, for example for other single-track vehicles. The wheel has a rim, which is approximately U-shaped in cross section, for a tubed or tubeless tire; the wheel also has spokes which are unitarily molded onto the rim via injection molding which originates from the wheel hub.

2. Description of the Prior Art

In general, during manufacture of a wheel of synthetic material by injection molding in a mold, the wheel must, due to its geometrical shape, and in order to achieve optimum material properties, be centrally injection molded at the wheel hub, from where the synthetic material flows in the mold to the wheel rim. However, when a wheel comprising a rim, spokes, and hub is being homogeneously manufactured completely out of synthetic material, drawbacks result at the rim after the synthetic material has flowed through the spokes in the mold. These drawbacks result from the formation of a flow seam approximately in the middle of the rim portion between each two adjacent spokes. This formation of flow seams, especially with the use of synthetic material which is reinforced with glass fibers, leads to a considerable reduction of the ruggedness, the impact strength, and the appearance of the rim at these middle rim portions. Attempts were made to circumvent these disadvantageous flow seam formations in the rim profile of a spoked wheel of synthetic material by means of a multiple injection molding of the wheel at the rim. However, wheels produced pursuant to this method, have a great tendency toward distortion due to the varying pressure and shrinkage conditions in the mold. Furthermore, the formation of flow seams occurs in the vicinity of the hub of the wheel, as a result of which the problems of cold flow seams at the synthetic material hub, which receives the wheel bearings and is subjected to great stresses, lead to a particularly critical reduction in strength.

An object of the present invention is to avoid the drawbacks of heretofore known wheels of synthetic material, while still providing for injection molding which originates at the wheel hub.

BRIEF DESCRIPTION OF THE DRAWING

This object, and other objects and advantages of the present invention, will appear more clearly from the following specification in conjunction with the accompanying drawing, in which.

SUMMARY OF THE INVENTION

Figure 1:
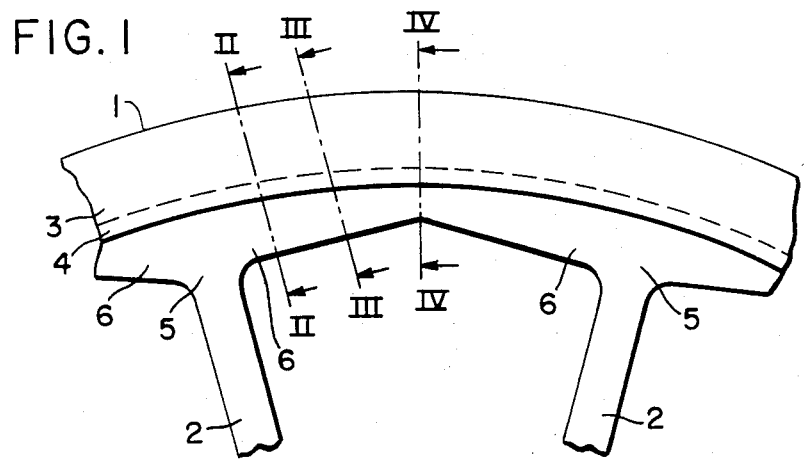
FIG. 1 is a side view of a portion of one exemplary embodiment of the inventive wheel of synthetic material.

The inventive synthetic material wheel for avoiding the aforementioned flow problems and disadvantageous flowseam formations in the rim profile is characterized primarily in that the rim, between each two adjacent spokes, is provided with wall elements which extend in the circumferential direction of the rim from the connection location of each spoke to the rim to the middle of the rim portion located between two spokes; the wall elements are rheologically designed preliminary flow cross-sectional areas such that the synthetic material in these wall elements flow more quickly from the spoke connection locations to the middle of the rim portion than in the remaining rim walls.

In so doing, the following is achieved. Without the inventive wall elements, the synthetic material which flows into the rim through one of the stokes is distributed at the spoke connection location over the cross-sectional area of the rim and flows into the rim walls with a front which advances relatively uniformly in the circumferential direction of the rim and to the middle of the rim portion between two adjacent spokes while at the same time cooling off; in this middle portion of the rim, the synthetic material meets a circumferential flow which arrives in the same manner through the rim walls from an adjacent spoke while forming a flow seam between two circumferential flows at a reduced ruggedness and impact strength. In contrast, with the inventive rheologically acting wall elements, which are designed as preliminary flow cross-sectional areas, there occurs in these wall elements a more intensive and rapid preliminary flow of the synthetic material in the circumferential direction of the rim due to the larger volume, relative to the remaining rim walls, and due to the therefore slower cooling and setting of the synthetic material from the outside toward the inside in these wall elements. This more intensive and more rapid preliminary flow of the synthetic material in the circumferential direction of the rim leads the circumferential flow in the remaining rim walls and reaches the middle of the rim portion between two adjacent spokes ahead of this circumferential flow. Accompanied by simultaneous pressure build up in the preliminary flow cross-sectional areas, the preliminary flow meets the preliminary flow coming in a similar manner from the adjacent spoke at the middle of the rim portion, so that the two preliminary flows, before the circumferential flows in the remaining rim walls can meet at the center of the rim portion, begin, as they are distributed over the entire periphery of the rim portion, to flow into the remaining rim walls, which extend partially in the axial direction of the wheel, and partially in the radial direction of the wheel. In this manner, the filling of the rim portion over its circumferential length is made uniform in place and time, and the disadvantageous formation of cold flow seams at the middle of the rim portion is avoided. Tests have shown that a synthetic material wheel which is designed and manufactured with the inventive rim wall elements has a considerably higher strength of the rim than does a wheel which is designed an manufactured without these rim wall elements.

The inventive rim wall element, which is designed and operates as a preliminary flow cross-sectional area, for example, can comprise a bead-like or rib-shaped widened cross-sectional area portion which projects from the base on the inner surface of the U-shaped rim. This widened portion extends in the circumferential direction of the rim over the connection locations of these spokes on the outer surface of the rim to the remaining rim walls. With this embodiment, the wall element itself, of an additional rim wall element which extends in the circumferential direction of the rim, pursuant to a further feature of the present invention, at the same time can be designed in such a way that between these wall elements and the two sides of the rim two annular grooves are formed for receiving the sides of a tire; furthermore, the lateral distance of the wall element from the two rim sides, and the radial height of the wall element, are such that when the tire sides are placed in the annular grooves, they always, even in case a central offset exists between the rim and the tire, make contact with the rim sides due to the wall element. This inventive embodiment of the rim has the further great advantage that the wheel is particularly suitable for use with a tubeless tire, because after mounting the tire engages the rim sides all around in a satisfactory and air impermeable manner, so that it can be easily inflated with a hard pump, for example a conventional bicycle pump, and does not, after mounting, first have to be spread apart and pressed outwardly by the rapid introduction of large quantities of air to such an extent that it begins to sealingly rest against the sides of the rim.

Pursuant to a preferred embodiment of the present invention, the wall element comprises a rim web or element which projects from the outer surface of the rim and has its ends connected to the spokes. That peripheral edge of the rim element which merges with the remaining rim walls preferably has a cross-sectional width which becomes smaller from the middle of the rim portion toward the spokes.

DESCRIPTION OF PREFERRED EMBODIMENTS

Figure 2:
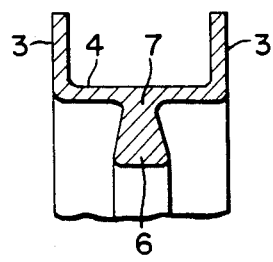
FIG. 2 is a view that shows a radial cross section through the wheel taken along line 11—II in FIG. 1.
Figure 3:
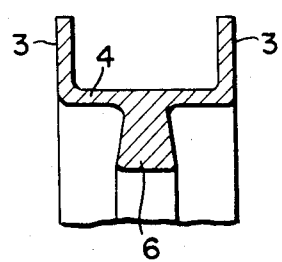
FIG. 3 is a view that shows a radial section taken along the line III—III in FIG. 1.
Figure 4:
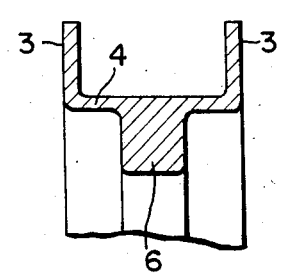
FIG. 4 is a view that shows a radial section taken along line IV—IV in FIG. 1.

Referring now to the drawing in detail, the inventive wheel of synthetic material comprises a rim 1, which has an approximately U-shaped cross section, a plurality of spokes 2, which are unitarily molded with the rim, and a non-illustrated wheel hub, starting from which the synthetic material wheel is injection molded during manufacture in a mold. The rim profile comprises as customary, relatively thin rim walls, two sides 3 and a base 4, to which are connected the spokes 2 at connection locations 5. Each rim portion between two adjacent spokes 2 is provided with a wall element which, starting from the connection location 5 of a given one of the spokes 2, extends in the circumferential direction of the rim to the middle of the rim portion between two spokes, and which, relative to the flow cross-sectional area of the remaining rim walls 3 and 4, rheologically has a larger volume preliminary flow cross-sectional area such that the synthetic material, which at the spoke connection locations 5 flows out of the spokes 2 into the rim profile, flows more quickly in this wall element from the spoke connection locations toward the middle of the rim portion than it does in the remaining rim walls 3 and 4. In a preferred and rheologically advantageous manner, this wall element is formed at the base 4 of the rim profile, and, as illustrated in the embodiment of FIGS. 1 to 4, comprises a rim web or element 6 which projects from the surface of the rim, and the ends of which are connected to the spokes. The element 6 can have a radial cross-sectional height which is desirable for an additional reinforcement of the rim. The cross section of the element 6, which is preferably wider than the remaining rim walls 3 and 4, is furthermore of such a size that the element 6 forms a large-volume flow channel for the synthetic material. In this flow channel, therefore, a slower cooling and setting of the synthetic material from the wall of the mold to the core of the cross-sectional area takes place than is the case with the remaining rim walls 3 and 4. As a result, starting from the connection locations 5 of two adjacent spokes 2, there occurs in the element 6 a rheological preliminary flow of the synthetic material towards the middle of the rim portion; this preliminary flow, upon flowing and/or after reaching the middle of the rim portion along the entire circumferential length thereof, starts flowing into the rim base 4 and radially into the rim sides 3, before the two circumferential flows of the synthetic material progressing from the spoke connection locations 5 into the rim walls 3 and 4 reaches the middle of the rim portion between two adjacent spokes 2. This prevents the cold flow seam formation of the synthetic material at the middle of the rim portion. In order to promote the preliminary flow of synthetic material in the element 6 toward the middle of the rim portion, the element preferably can be designed in such a way that at its peripheral edge, which merges into the rim walls 3 and 4, it has a cross-sectional width 7 which becomes narrower proceeding from the middle of the rim portion toward the spokes, i.e. the spoke connection locations 5, as illustrated in FIGS. 2 to 4. As a result, in the vicinity of the spokes the exit of synthetic material from the element 6 into the remaining rim walls 3 and 4 is restricted and impeded, and a still more distinct rheological preliminary flow in the element 6 forward the middle of the rim portion is produced.

Figure 5:
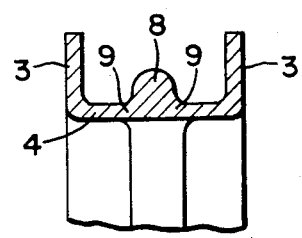
FIG. 5 is a view that shows a radial section through another inventive embodiment of a wheel of synthetic material.

In addition to, or in place of, the rim elements 6 on the outer surface of the rim, the rim, pursuant to a further specific embodiment of the present invention as illustrated in FIG. 5, also can be provided with a rheological preliminary flow cross-sectional area in the form of a widened cross-sectional area portion 8 which projects on the inner surface of the rim from the base 4 in the manner of a bead or rib. The large volume widened cross-sectional area portion 8 extends annularly in the circumferential direction of the rim over all of the spoke connection locations 5 and laterally merges into the base 4 via cross-sectional areas 9 which act in a restraining manner. The synthetic material which enters the rim profile at a given spoke connection location 5 is divided into a peripheral flow in the rim walls 3 and 4, and into a preliminary flow in the widened cross-sectional area portion 8, from which part of the synthetic material which is distributed over the periphery of the rim flows axially and radially through the cross-sectional areas 9 into the rim walls 3 and 4, although synthetic material predominately flows preliminarily from two adjacent spokes toward the middle of the rim portion and after meeting at the middle of the rim portion flows into the rim walls 3 and 4 counter to the peripheral flows, in order in this way to prevent the development of a cold flow seam between the two peripheral flows at the middle of the rim portion.

Figure 6:
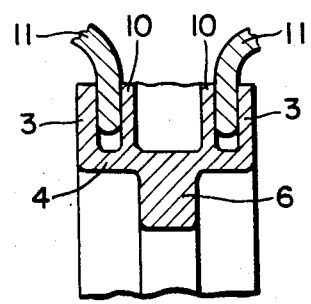
FIG. 6 is a view that shows a radial section through a further inventive embodiment of a synthetic material wheel for a tubeless tire.

In the embodiment illustrated in FIG. 6, a wall section 10 is provided which projects from the base 4 on the inner surface of the rim. The wall section 10 can have such an effective flow cross-sectional area for material flow in the peripheral direction of the rim that, similar to the widened cross-sectional area portion 8 in the embodiment of FIG. 5, it acts as a large-volume rheological preliminary flow channel. Alternatively, the wall section 10 can also comprise a material-saving rib arrangement which complements the rheological preliminary flow effect of a rim element 6 disposed on the outer surface of the rim in a manner similar to that of the embodiment of FIGS. 1 to 4. In particular, the wall section 10 of the embodiment of FIG. 6 is designed in such a way that between the section 10 and the two sides 3 of the rim two annular grooves are formed for receiving the sides 11 of a tire. The space between a given wall section 10 and the adjacent side 3 of the rim, in other words the axial opening of the two annular grooves, is such that the two tire sides 11, after being inserted into these annular grooves, are in contact with both the wall section 10 and the rim side 3. Furthermore, the radial height of the wall sections 10 is such that both of the tire sides 11 will also extend into the annular grooves, and will contact the rim sides 3 and the wall sections 10, if the tire is mounted in such a way that a central offset between the rim and the tire results, which can occur due to the difference between the inner diameter of the tire sides and the diameter of the rim base, which, for example, is customary with bicycle tires. Consequently, the embodiment of FIG. 6 makes it possible to also be able to use on the wheel rim a tubeless tire which already during mounting is pressed by the wall section 10 against the side 3 of the rim in such a way that air which is pumped in does not escape or at least the escape of such air is limited to such an extent that the tire can be pumped up and inflated with an ordinary hand pump. A rim designed with wall sections 10 as in the above described embodiment of FIG. 6 is suitable for use with tubed tires without the tube or with special tubeless tires, and is likewise advantageous for other wheels the rims of which are connected with the wheel hub, for instance by means other than spokes, or the rim of which is not unitarily produced with the spokes from synthetic material and is sealed in an air tight manner at the spoke connection locations in any suitable way.

The present invention is, of course, in no way restricted to the specific disclosure of the specification and drawing, but also encompasses any modifications within the scope of the appended claim.

What we claim is:

1. A wheel of synthetic material, comprising a hub and spokes and a rim, said rim including main rim walls having a predetermined rim cross section and being unitary with said spokes at spoke connection locations on said rim, said hub being unitary with said spokes and being the injection-molding center part of the wheel, the improvement therewith which comprises:

said rim being provide with a plurality of circumferentially extending additional rim wall elements of synthetic material between all of said spokes, each of said wall elements leading from said spoke connection location of a given spoke to the middle of a rim portion located between two adjacent spokes and each of said wall elements being designed, in comparison with said main rim walls with respect to the rheological cross-sectional area thereof, with an advance-flow cross-sectional area, the synthetic material in each of said wall elements at the middle of said rim portion, where two of said wall elements join one another, and the synthetic material in said main rim walls of said rim portion between said two adjacent spoke connection locations being free from cold flow seams, in which each of said wall elements is a rim element connected to said spokes and which projects radially inwardly from a surface of said rim and has two ends, one of which merges with said connection location of a given spoke, and the other of which merges in the middle of a rim portion with an end of another rim element extending from an adjacent spoke, in which each of said rim elements has a radially outwardly disposed circumferential edge which merges with said remaining rim walls, and which has a varying cross-sectional width which steadily decreases in the direction from the middle of a rim portion toward a spoke.

* * * * *